(12) United States Patent
Vatanen et al.

(10) Patent No.: US 7,935,179 B2
(45) Date of Patent: *May 3, 2011

(54) METHOD AND ARRANGEMENT FOR EXHAUSTING GAS FROM A COATING MATERIAL

(75) Inventors: Heikki Vatanen, Järvenpää (FI); Timo Nurmiainen, Järvenpää (FI); Jukka Koskinen, Järvenpää (FI); Ilpo Honkanen, Järvenpää (FI)

(73) Assignee: Metso Paper, Inc., Helsinki (FI)

( * ) Notice: Subject to any disclaimer, the term of this patent is extended or adjusted under 35 U.S.C. 154(b) by 697 days.

This patent is subject to a terminal disclaimer.

(21) Appl. No.: 11/915,973

(22) PCT Filed: May 22, 2006

(86) PCT No.: PCT/FI2006/050203
§ 371 (c)(1),
(2), (4) Date: Nov. 29, 2007

(87) PCT Pub. No.: WO2006/128963
PCT Pub. Date: Dec. 7, 2006

(65) Prior Publication Data
US 2008/0166488 A1 Jul. 10, 2008

(30) Foreign Application Priority Data
Jun. 2, 2005 (FI) .................................... 20055280

(51) Int. Cl.
*B01D 19/00* (2006.01)
(52) U.S. Cl. ................ 95/261; 95/266; 96/195; 96/196; 96/208; 96/216
(58) Field of Classification Search ..................... 95/243, 95/244, 246, 247, 248, 260, 261, 266, 241, 95/254; 96/167, 177, 196, 204, 208, 214, 216, 217; 427/240, 294, 295, 297, 298, 420; 159/6.1, 6.2, 6.3, 6.7, 9.1, 9.2, 11.2, 12, 13.2, 15

See application file for complete search history.

(56) References Cited

U.S. PATENT DOCUMENTS
3,213,592 A * 10/1965 Rich .................................. 95/30
(Continued)

FOREIGN PATENT DOCUMENTS
JP  63-181404  11/1988
(Continued)

OTHER PUBLICATIONS
Written Opinion of the International Searching Authority issued in PCT/FI2006/050203.
(Continued)

*Primary Examiner* — Duane Smith
*Assistant Examiner* — Thomas Bennett McKenzie
(74) *Attorney, Agent, or Firm* — Stiennon & Stiennon

(57) ABSTRACT

A method and apparatus for exhausting gas from a coating material. The coating material is fed in the bottom part area of a drum (3) rotating around an essentially vertical axis inside a vacuum tank (1), whereby the rotating motion of the drum causes the coating material to rise up the inner wall of the drum and to discharge from the upper edge of the drum as a thin film against the inner wall of a vacuum tank, wherefrom the coating material flows downwards. The coating material is arranged to rise up the wall of the drum stepwise, so that the coating material will form a thin veil-like film on at least two different step levels (10-12), whereupon the gas bubbles in the coating material will break and be discharged from the coating material.

12 Claims, 3 Drawing Sheets

U.S. PATENT DOCUMENTS

| | | | |
|---|---|---|---|
| 3,856,483 A | | 12/1974 | Rumpf et al. |
| 4,153,500 A * | | 5/1979 | Feres .............................. 159/6.1 |
| 4,361,490 A * | | 11/1982 | Saget ............................ 210/787 |
| 4,624,687 A * | | 11/1986 | Pere ................................ 96/215 |
| 4,657,677 A | | 4/1987 | Roubicek et al. |
| 5,224,996 A * | | 7/1993 | Ghys et al. .................... 118/325 |
| 5,447,753 A * | | 9/1995 | Noda et al. .................... 427/296 |
| 5,591,252 A * | | 1/1997 | Haeuser .......................... 95/260 |
| 5,755,924 A * | | 5/1998 | Feres ............................ 159/6.3 |
| 5,951,877 A * | | 9/1999 | Langley et al. ............... 210/782 |
| 5,972,171 A * | | 10/1999 | Ross et al. ...................... 203/40 |
| 6,629,821 B1 * | | 10/2003 | Yokota et al. .............. 417/199.1 |
| 6,630,013 B2 * | | 10/2003 | Myrttinen et al. ............. 95/243 |
| 6,723,205 B1 * | | 4/2004 | Meinander ................... 162/189 |
| 6,726,743 B2 * | | 4/2004 | Louks et al. ...................... 95/30 |
| 6,827,820 B1 * | | 12/2004 | Meinander ................... 162/189 |
| 2002/0020296 A1 * | | 2/2002 | Illingworth .................... 95/270 |

FOREIGN PATENT DOCUMENTS

| | | |
|---|---|---|
| JP | 04-361696 | 12/1992 |
| JP | 09-103601 | 4/1997 |
| JP | 2001-009206 | 1/2001 |
| JP | 2004-186510 A | 7/2004 |
| JP | 2004-290859 A | 10/2004 |
| WO | 2006/128963 A2 | 12/2006 |

OTHER PUBLICATIONS

Search Report issued in PCT/FI2006/050203.
Search Report with issued in FI20055280.
English translation of Abstract in JP 2004-290859.
English translation of Abstract in JP 2004-186510.
Translation of an Office Action of Japan Patent Office for 2008-514134.

* cited by examiner

METHOD AND ARRANGEMENT FOR EXHAUSTING GAS FROM A COATING MATERIAL

CROSS REFERENCES TO RELATED APPLICATIONS

This application is a U.S. national stage application of International App. No. PCT/FI2006/050203, filed May 22, 2006, the disclosure of which is incorporated by reference herein, and claims priority on Finnish App. No. 20055280, filed Jun. 2, 2005.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a method and arrangement for exhausting gas from a coating material. In the method, the coating material is fed in the bottom part area of a drum rotating around an essentially vertical axis, whereby the rotating motion of the drum causes the coating material to rise up the inner wall of the drum and to discharge from the upper edge of the drum as a thin film against the inner wall of a vacuum tank, wherefrom the coating material flows downwards. The apparatus comprises a tank, including means for providing a vacuum in the tank, a drum arranged inside the tank to rotate around a vertical axis, means for feeding coating material inside the drum, and means for discharging the coating material from the tank.

In the process industry, the mixing of gases, such as air, with the liquids and compounds used in the process typically causes many problems. Particularly in the coating of paper or a corresponding web material, the gas and gas bubbles present in the coating material cause unevenness on the surface of the paper, and even areas completely lacking coating. With some coating materials, the problem is greater than with others, but the problem is emphasized especially with coating materials which bind more gases than others. For example, coating materials containing talcum typically contain a lot of gas due to the properties of talcum.

In addition, the significance of the problem depends on the coating process used. In curtain coating, for instance, the gas content of the coating material may not be higher than 0-0.25 percent by volume. Otherwise the gas bound in the coating may cause uncoated spots in the material to be coated, such as paper or board.

In multilayer curtain coating, the significance of gas exhaustion is increased further. This means that if there are, for instance, three or four coating layers, gas must be exhausted as carefully as possible from the coating used for making each layer.

For exhausting gas mixed with and dissolved in coating material have been developed vacuum deaerators, one known implementation of which is shown in FIG. 1. The device comprises a rotating drum arranged inside a vacuum tank, inside which the coating material is conducted, whereupon due to the centrifugal force, the coating material rises up the inner wall of the drum and discharges from the drum as a thin film colliding with the wall of the vacuum tank.

The problem with prior art vacuum deaerators is their insufficient deaeration efficiency, especially with high-viscosity materials. This is because even under an extremely high vacuum, that is, low absolute pressure, the small air bubbles contained in high-viscosity coating materials are unable to grow large enough to be broken or to be distinguished due to their specific rising speed. Attempts have been made to eliminate this problem by increasing the vacuum, but as a result, the solvent used in the coating material evaporates extremely readily, thus deteriorating the quality of the coating material due to, for example, an increase in the solids content of the coating material following the evaporation of the solvent. As another method are used longer mixing periods, but then the functional capacity of the deaerators remains too low, whereby more devices have to be bought. Moreover, if the separating capacity of known deaerators is increased by increasing the size of the devices, the size of the devices will become excessive and manufacturing costs will increase markedly.

SUMMARY OF THE INVENTION

The aim of the method and arrangement according to the present invention is to provide an improved solution for vacuum-operated gas separation by means of which gas contained in coating material can be exhausted better than before. To achieve the aims of the invention, the method according to the invention is characterized in that in the method, the coating material is arranged to rise stepwise up the wall of the drum, so that the coating material will form a thin veil-like film on at least two different step levels, whereupon the gas bubbles in the coating material will break and discharge from the coating material. The apparatus according to the invention is, in turn, characterized in that the inner surface of the drum is designed to be stepped, comprising at least two step levels so that the coating material rising upwards due to the effect of the rotating motion will form a thin veil-like film on the said at least two step levels, respectively.

In a preferred embodiment according to the present invention, an absolute pressure of about 1 kPa-15 kPa is provided in the vacuum tank. If the absolute pressure provided in the tank is lower, then, for instance, the evaporating point of the solvent contained in the coating material falls, and there is a risk that the quality of the coating material will deteriorate as a result of gas exhaustion.

On the other hand, if a higher absolute pressure is provided in the tank, it will not necessarily be sufficient for increasing the size of the gas bubbles by means of a vacuum. In a highly advantageous case, an absolute pressure of about 3 kPa-15 kPa is provided in the vacuum tank. Increasing the lower limit of the absolute pressure applied ensures even better that the coating material will not be able to evaporate during gas exhaustion.

In the method according to the invention, the thickness of the final veil-like film discharged from the upper edge of the drum is adjusted so as to be at most as thick as the desired coating layer. The thickness of the film can be controlled, for example, by controlling the speed of rotation of the drum and/or the amount of coating material fed into the drum.

In the apparatus according to the invention, the radial distance between the said at least two step levels is preferably within the range from 20 mm to 200 mm, more preferably within the range from 40 mm to 120 mm, and the difference in height between the said at least two step levels is preferably within the range from 20 mm to 150 mm, more preferably within the range from 40 mm to 100 mm. The ratio of the diameter of the drum to its height is preferably within the range from 1:1 to 10:1, more preferably within the range from 1:1 to 5:1.

In the apparatus according to the invention, on the outer surface of the drum are preferably arranged vanes by means of which the desired pressure impact can be exerted on the surface of the coating material in the vacuum tank, which will reduce or completely remove any foam forming on the bottom of the tank due to the boiling of the paste under low pressure.

The greatest advantage of the method and arrangement relating to the present invention is its efficiency, whereby gas contained in coating material can be rapidly and carefully exhausted from a large amount of coating material.

The invention is described in greater detail in the following, with reference to the accompanying drawing.

DESCRIPTION OF THE PREFERRED EMBODIMENTS

Figure 1:
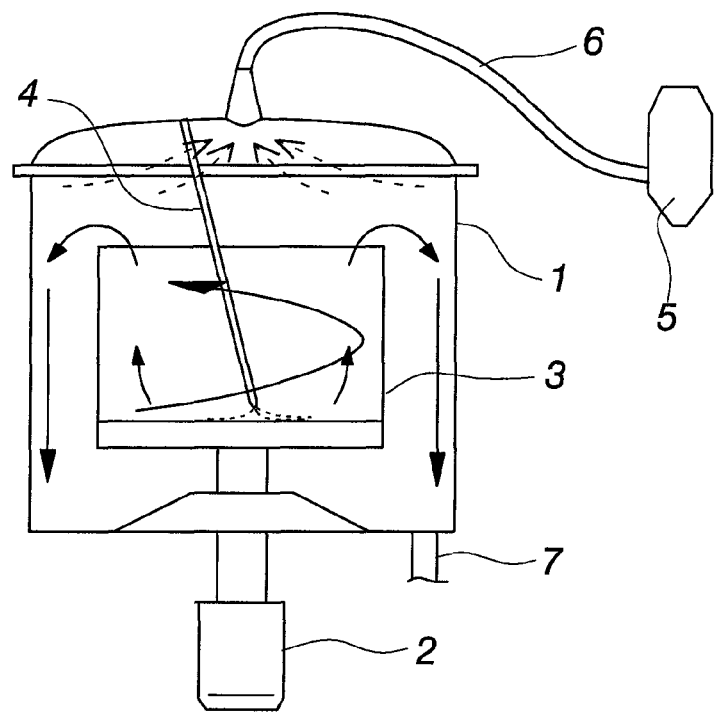
FIG. 1 shows diagrammatically a prior art vacuum deaerator.

FIG. 1 shows diagrammatically a prior art vacuum device for exhausting gas, typically air, from coating material. As shown in the figure, the arrangement comprises a sealed vacuum tank 1, inside which is provided a drum 3 rotated by a motor 2. The gas-containing coating material is fed inside the drum via a pipe 4. The tank is connected to a vacuum source 5 by means of a vacuum pipe 6. When the drum rotates, the coating material rises up the inner wall of the drum due to the effect of centrifugal force and is centrifuged as a thin film tangentially from the upper edge of the drum 3, colliding with the inner wall of the vacuum tank, on which it flows downwards, discharging from the bottom part of the tank through the outlet 7. The air bubble following the film breaks and the air formed is exhausted through the vacuum pipe, via a deaerator in conjunction with the vacuum source.

Figure 2:
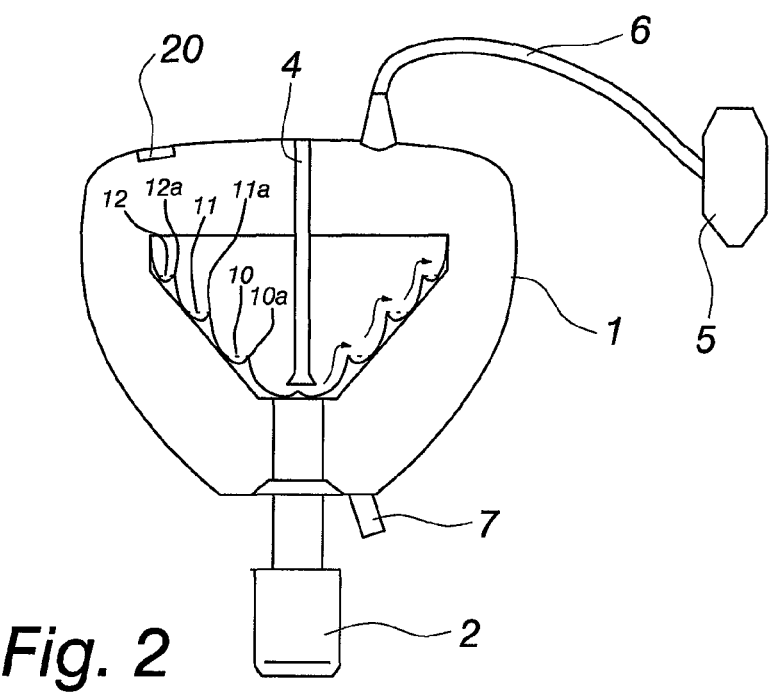
FIG. 2 shows a diagrammatic view in principle of an apparatus according to the invention.

FIG. 2 shows an implementation of the apparatus according to the invention as a diagrammatic view in principle. The apparatus comprises a rotating drum 3 arranged inside a vacuum tank 1, which is driven by a motor 2. The inner surface 21 of the drum is made so as to be stepped, comprising in the embodiment shown three step levels 10, 11, 12, so that due to the effect of the rotating motion, the upwards rising coating material will form a thin, veil-like film on each of the said step levels, respectively. Once discharged from the final step, the paste film 22 is led from the upper edge 23 of the drum to the inner wall 24 of the vacuum tank and along that, further to the bottom part of the tank to be transferred to the target of use through outlet 7. In the top part area of the tank 1 are preferably arranged means 20 for imaging the veil-like film, whereby when the veil-like film remains intact, there will be no more air bubbles left in the paste. The image data obtained from the imaging means 20 can be used to control the operational parameters of the degassing device.

The step levels may be made, for example, in accordance with FIG. 2 of successive concave sections, the front edges 10a, 11a, 12a of which determine the elevation of the step level, that is, the elevation of the thin, veil-like film formed. To achieve efficient gas exhaustion and for compact dimensioning of the apparatus, the difference in height h between successive step levels is preferably within the range from 20 mm to 150 mm, more preferably within the range from 40 mm to 100 mm. The radial distance between the step levels, that is, the width w of the veil formed is preferably within the range from 20 mm to 200 mm, more preferably within the range from 40 mm to 120 mm.

The solution according to the invention enhances gas exhaustion from paste and increases capacity. The solution also makes possible monitoring during the process and controlling of the operational parameters on the basis of the monitoring. The operational parameters include the speed of rotation of the drum 3, the vacuum level in the tank 1, the height of the liquid level at the bottom of the tank 1, which is influenced by the feed rate of the paste fed into the drum and the discharge rate of the paste led out of the tank.

Multi-step veiling of coating paste enhances air exhaustion, whereby it is possible to apply a higher minimum absolute pressure level than in earlier solutions, thus avoiding deterioration of the paste quality, which might result from the possible evaporation of some of the components in the paste caused by too low a pressure level.

Figure 3:
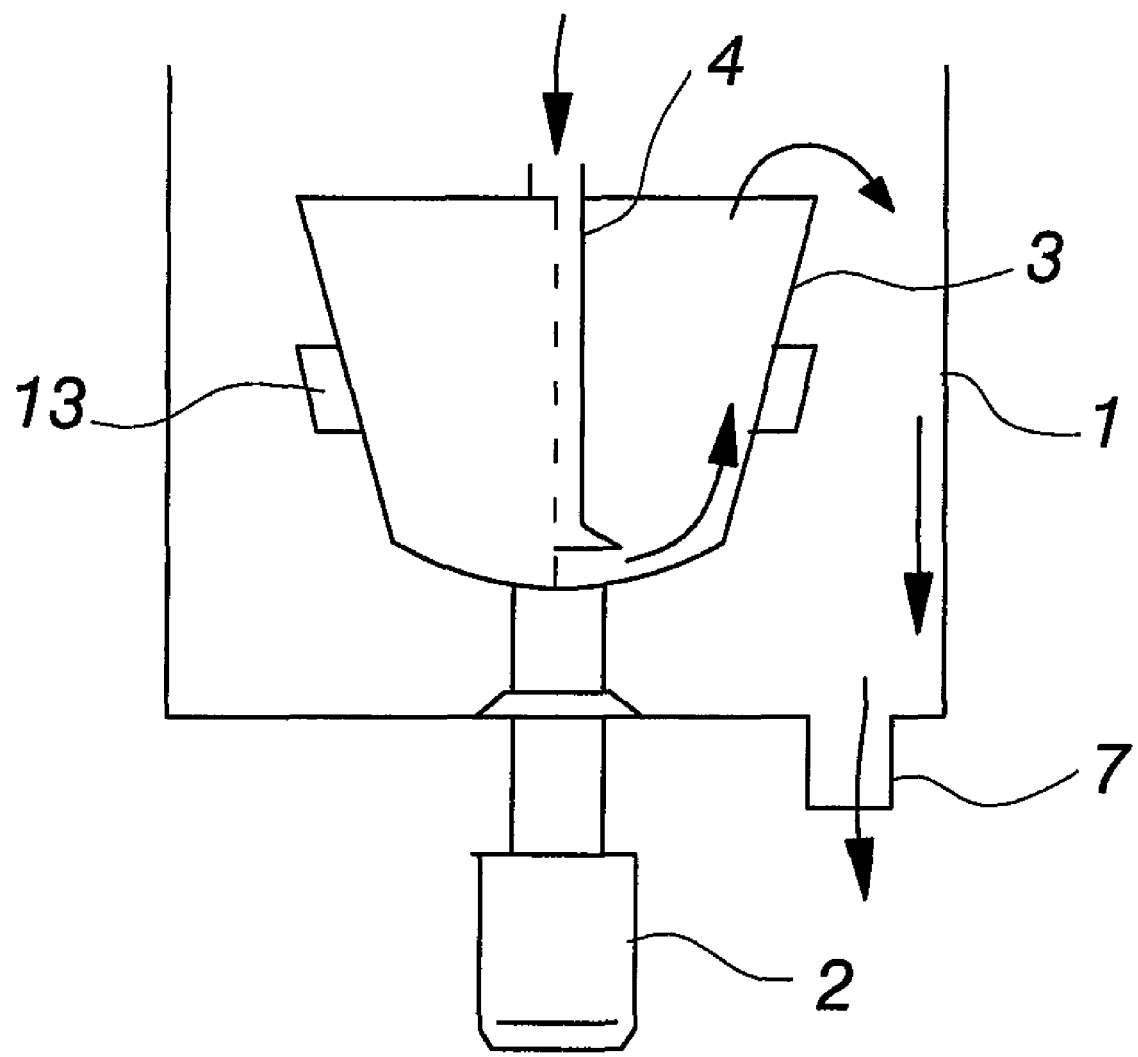
FIG. 3 shows diagrammatically a further development of the apparatus according to the invention.
Figure 4:
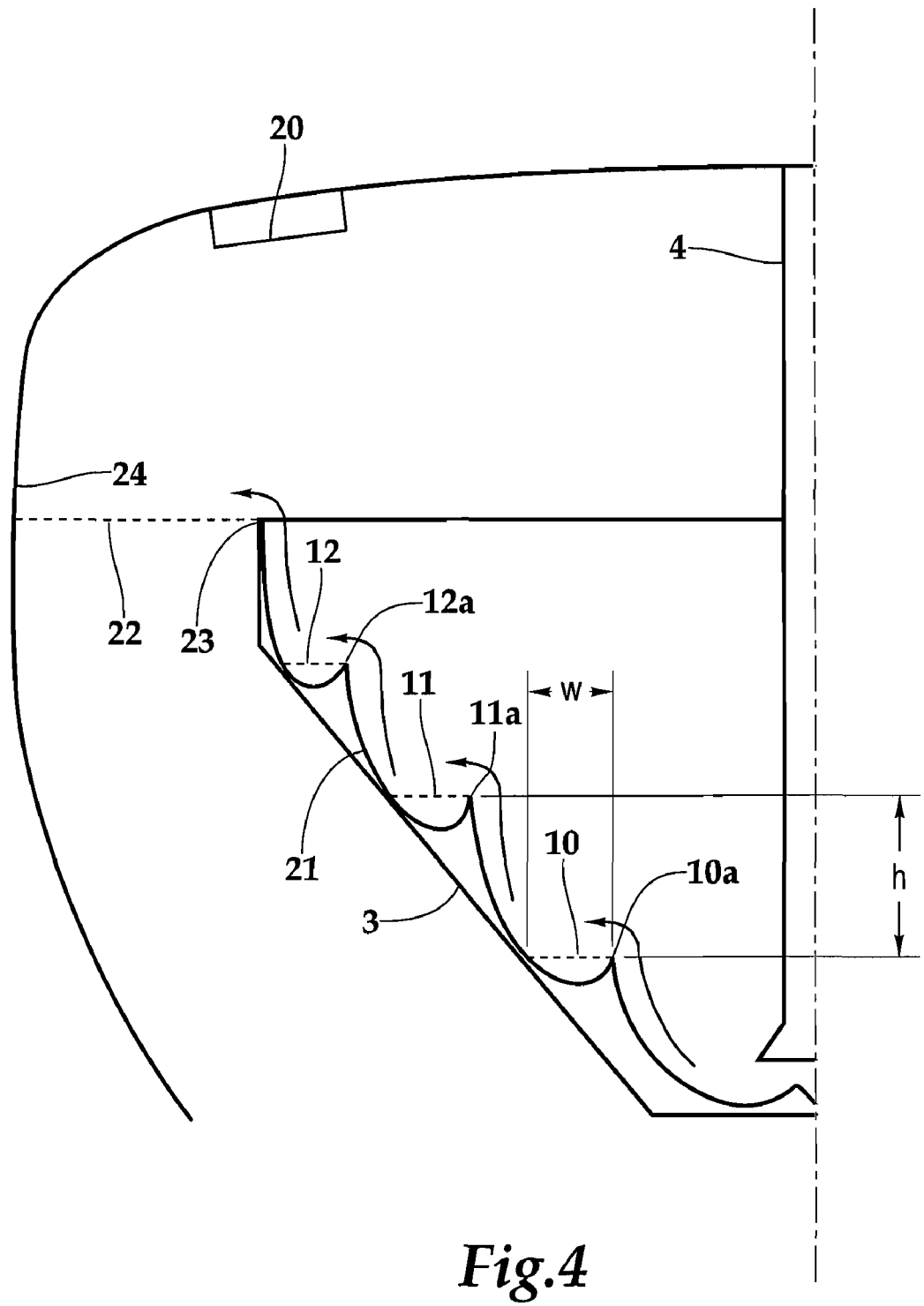
FIG. 4 shows an enlarged portion of the apparatus of FIG. 2.

FIG. 3 shows a further development of the apparatus according to the invention, where vanes 13 are formed on the outer surface of the drum 3. The vanes are designed in such a way that they will direct the flow of air downwards towards the bottom of the container, whereupon pressure will rise beneath the vanes. The pressure may be increased by increasing the number, size and angle of the vanes and by increasing the rotation speed of the drum. The increase in pressure reduces the pressure above the vanes, thus enhancing air exhaustion, and in addition, the flow of air caused by the vanes furthers the breaking of the gas bubbles in the foam. The vanes must be positioned symmetrically, so that they will not cause an imbalance in the rotating drum. The embodiment of FIG. 3 may also be realized in connection with a prior art vacuum exhaust device without the multi-step forming of a veil-like film according to the invention.

The solution according to the invention may advantageously be utilized in the curtain coating process, where the coating material is conducted to the curtain coater after gas exhaustion either directly or through one or more intermediate tanks. The intermediate tanks may optionally have their own supplementary gas exhaustion.

The invention claimed is:

1. A method for exhausting gas from a coating material comprising the steps of:
    feeding coating material to a bottom area of a drum rotating around an essentially vertical axis inside a vacuum tank, the vacuum tank having an inner wall, the vertical axis defining a radial direction and a height direction defined as extending vertically parallel to the vertical axis, wherein the drum has an inner wall with a plurality of steps, each step defining a level, which step levels ascend in the height direction as the steps progress outwardly in the radial direction;
    using forces created by rotating motion of the drum to cause the coating material to rise up the inner wall of the drum and flow over at least two of the plurality of steps;
    veiling the coating material over a front edge of each step to form a radially extending veil-like thin film of the coating material spaced from the inner wall of the drum, which extends between said front edge of the step to the inner wall of the drum; and
    conducting the coating material out of the tank.

2. The method of claim 1 wherein a radial distance defined between the said at least two successive step levels is within the range from 20 mm to 200 mm.

3. The method of claim 2 wherein the radial distance between the said at least two successive step levels is within the range from 40 mm to 120 mm.

4. The method of claim 1 wherein a difference in height defined between said at least two successive step levels is within the range from 20 mm to 150 mm.

5. The method of claim 4 wherein the difference in height between the said at least two successive step levels is within the range from 40 mm to 100 mm.

6. The method of claim 1 wherein after conducting the coating material out of the tank, further comprising the steps of:
   conducting the material from the vacuum tank to a curtain coater; and
   forming a coating layer on a paper web.

7. The method of claim 6 wherein the thickness of thin film discharged from the drum is adjusted to be at most as thick as the coating layer on a paper web.

8. The method of claim 7, wherein an absolute pressure of about 3 kPa to 15 kPa is provided in the vacuum tank.

9. The method of claim 1 wherein an absolute pressure of about 1 kPa to 15 kPa is provided in the vacuum tank.

10. The method of claim 1 wherein the rotating drum and vacuum tank comprise parts of a degassing device having operational parameters, and further comprising the steps of:
    imaging the veil-like thin films; and
    controlling the operational parameters of the degassing device until one of said veil-like films remains intact.

11. The method of claim 1 further comprising the steps of directing a flow of air downwards between the tank wall and the drum with a plurality of vanes symmetrically arranged on an outer surface of the drum.

12. The method of claim 1 further comprising the steps of causing the coating material to discharge from an upper edge of the drum as a thin film against the inner wall of the vacuum tank so that the coating material flows downwards along the tank inner wall before being conducted out of the tank.

* * * * *